Dec. 15, 1970   E. E. RICE ET AL   3,547,589
SHUTTLE TYPE PRESSURE VESSEL
Filed Dec. 14, 1967   4 Sheets-Sheet 1

INVENTORS
EDWIN E. RICE
WARREN A. RICE
BY
Miller Morriss Pappas & McLeod
ATTORNEYS

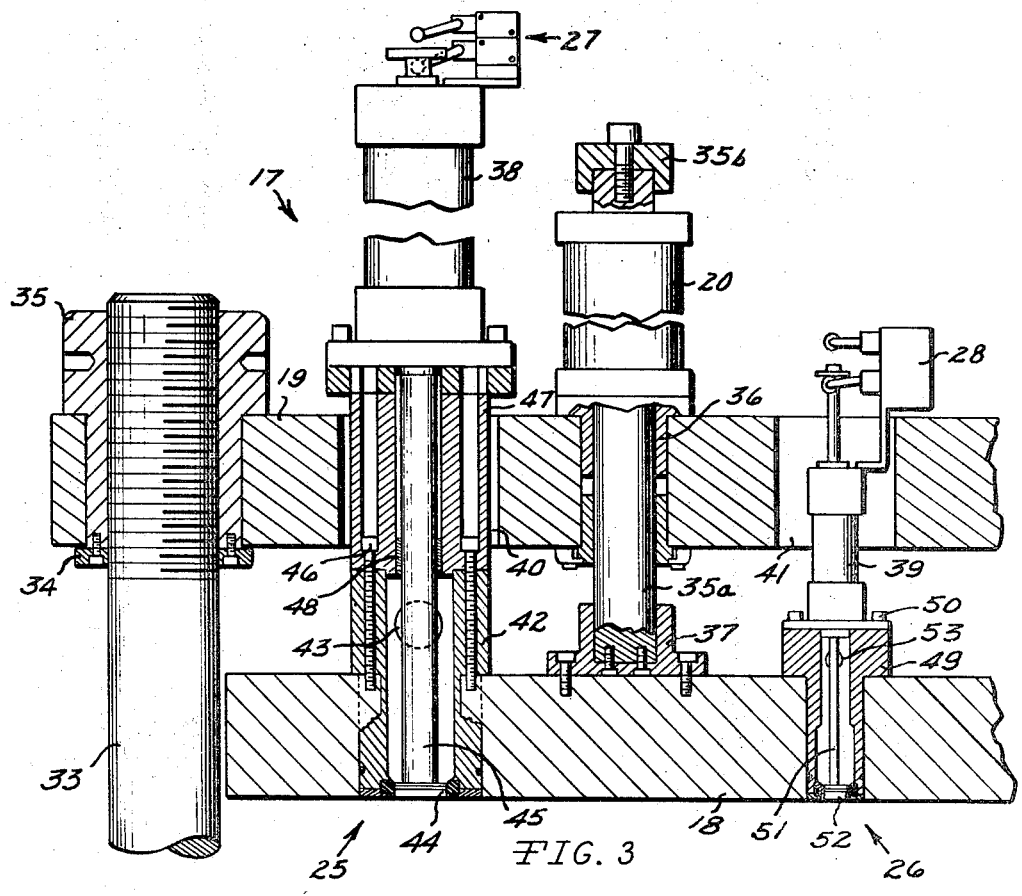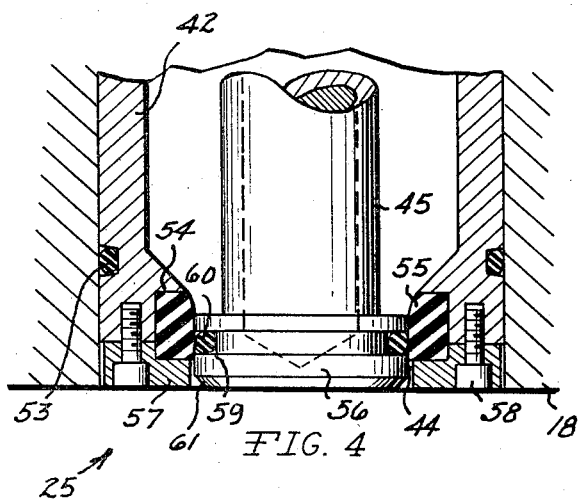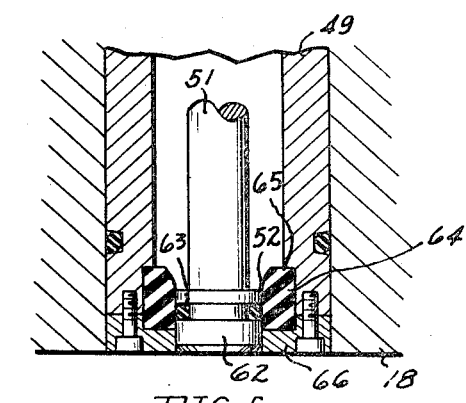

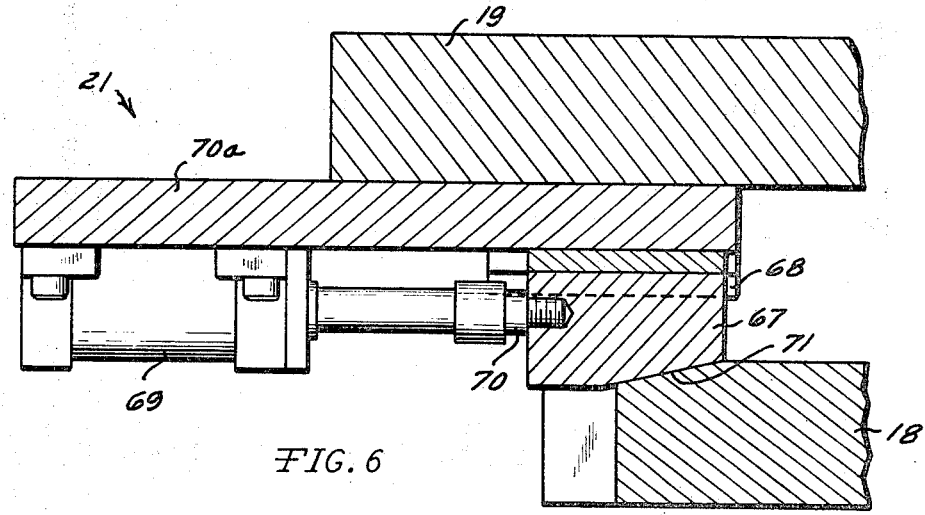
FIG. 6
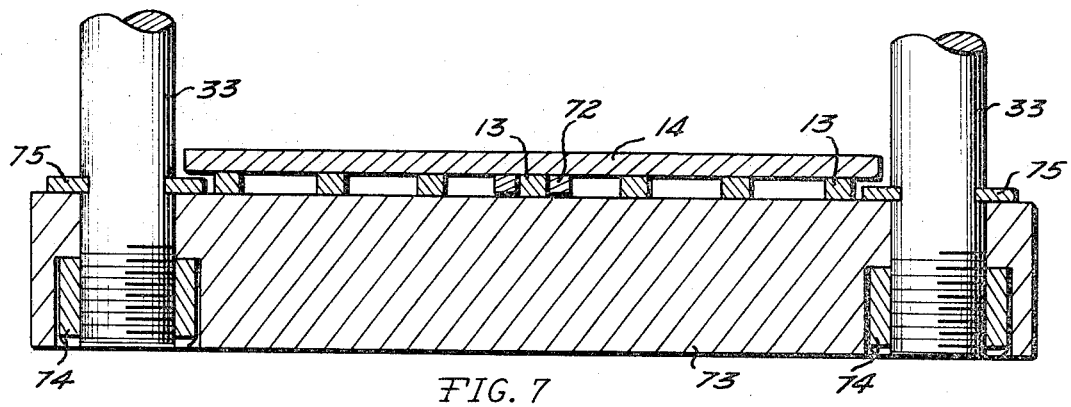
FIG. 7
| | CLEAR STA. 1 | GANTRY STA. 2 | CLEAR STA. 3 |
|---|---|---|---|
| SHUTTLE L | LOAD / VESSEL A | IDLE / VESSEL B | |
| SHUTTLE R | | FIRE / VESSEL A | LOAD / VESSEL B |
| SHUTTLE L | UNLOAD-LOAD / VESSEL A | FIRE / VESSEL B | |
| SHUTTLE R | | FIRE / VESSEL A | UNLOAD-LOAD / VESSEL B |
| SHUTTLE L | UNLOAD-LOAD / VESSEL A | FIRE / VESSEL B | |
FIG. 10
INVENTORS
EDWIN E. RICE
WARREN A. RICE
BY
Miller Morris Pappas & McLeod
ATTORNEYS

United States Patent Office

3,547,589
Patented Dec. 15, 1970

3,547,589
SHUTTLE TYPE PRESSURE VESSEL
Edwin E. Rice, Ann Arbor, and Warren A. Rice, Dexter,
Mich., assignors to Chemotronics, Incorporated, Ann
Arbor, Mich., a corporation of Michigan
Filed Dec. 14, 1967, Ser. No. 690,524
Int. Cl. B01j *3/02*
U.S. Cl. 23—252                    7 Claims

ABSTRACT OF THE DISCLOSURE

A pressure vessel structure for automating, loading, processing, and unloading in avoidance of process delay wherein at least a pair of pressure vessel elements are shuttled between a plurality of stations one of which is a closing, clamping and processing station. The invention includes an indexing means; the vessel adapted to process control at a single work station; the vessel closure and lock means separate from the vessel, and stock receiving means within the pressure vessel. The invention includes a device for automation of the process involving injection of an explosive mixture, purging sweep, ignition of the explosive mixture, and exhaust of spent gases from a reactor under the closed station location.

---

The present invention comprises a pressure vessel or reaction chamber of the shuttle type for facilitating the repetitious loading processing and unloading of materials to be subjected to a high pressure shock. More particularly the invention comprises a structure or apparatus which includes means for shifting pressure vessel elements to a process station whereupon the reactor contents at the station are sealed into the vessel, the reactor vessel is clamped closed as by wedge blocks acting on a valved closure, whereupon by virtue of the unique inner arrangements in the vessel, the contents are subjected to pressure treatment under selected process controls and the vessel is selectively opened and sequenced to an unloading station so that simultaneous loading and/or unloading proceeds while operations are being completed on the contents of another vessel.

Applicants know of no structurally similar devices and the principal object is to facilitate and automate a high pressure elevated temperature treatment of materials as contrasted to the use of a single pressure vessel in which loading and/or unloading must await the processing of materials monopolizing a pressure vessel or container.

Collaterally it is an object of the invention to provide shifting containers which index into a gantry or process station position and where a seal against substantial explosive pressures is accomplished and associated valving is located to control the progress and character of the treatment, for example, of cellular materials.

Another object is to provide access to the contents of the vessel at the work station so as to accomplish loading of the vessel with an explosive or combustible mixture, purge sweeping the contents of the vessel where required, igniting the charge in the vessel and then exhausting the gaseous contents of the vessel after reactions within the vessel have been completed.

The invention also contemplates an ignition system for explosive diffused gases which ignition of the gases can be remote from the vessel but is communicated thereto by selected conduits and including the sequential application of inert gases to the contents where necessary to prevent damage to the material being treated.

While the intent is that the device receives, treats and unloads cellular stock, the valved reactor vessel is usable for other chemical or physical process applications where a substantial pressure is involved in the presence of the material to be treated and where simultaneous unloading and/or loading can proceed.

Other objects including simplicity of construction and ease of maintenance with adequate safety will be appreciated by those skilled in the art as the description proceeds.

In the drawings:

FIG. 3 is a partial cross section view of the valve structure and cover lift elements as taken on the line III—III of FIG. 1.

FIG. 4 is an enlarged cross section elevation view detail of the principal valve seen in FIG. 3.

FIG. 5 is an enlarged cross section elevation view detail of the smaller valve seen in FIG. 3.

FIG. 6 is a partial cut-away section elevation of a locking wedge and cylinder.

FIG. 7 is an end cross section elevation view taken on the line VII—VII of FIG. 1 at the base thereof and indicating the shuttle slide structure.

FIG. 10 is a sequence diagram indicating the station sequencing of the Vessels A and B as related to the shuttle between Clear Stations 1 and 3 and Gantry Station 2.

GENERAL DESCRIPTION

Figure 1:
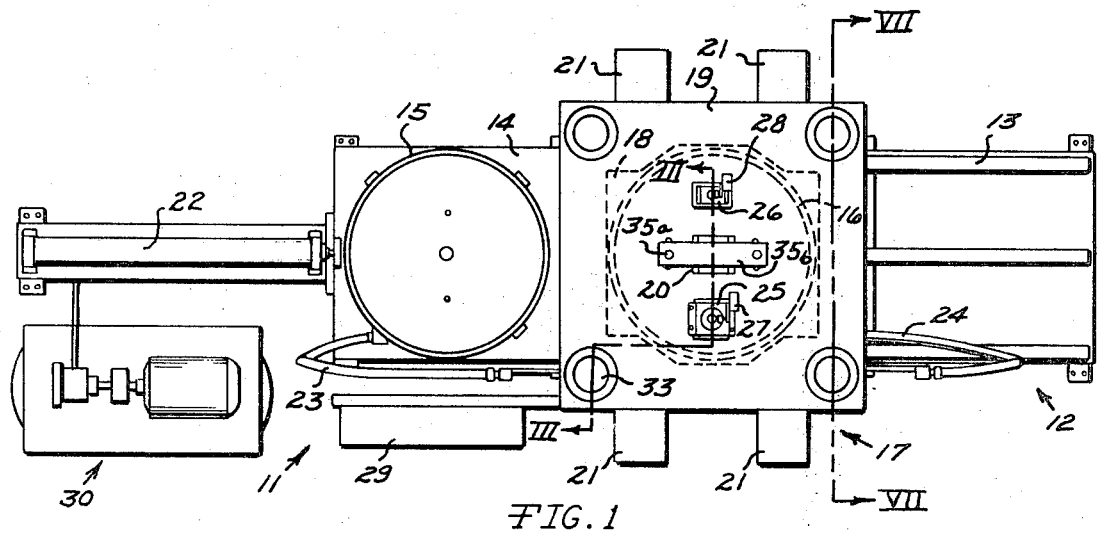
FIG. 1 is a top plan view of a shuttle unit in accord with the present invention.

In general the structure of the present invention comprises an indexing structure upon which is mounted a plurality of reactor vessels in fixed spaced relation. The indexing structure, such as a plate, is movable on guide elements, such as a track or way, to at least two station positions on the guide elements. In each station position one of the vessels or tubular cylinder is in registry at a process station such as beneath a gantry element. The gantry element includes a movable cover plate and separate closure means, such as, wedge blocks to secure the cover plate on the vessel in registry beneath the gantry whereby the vessel or cylinder, the shuttle plate and the cover provide a closed chamber or sealed reactor. The cover element is provided with valved openings and through the shuttle plate or base other openings are provided into the closed chamber. As will be seen, valving in the cover allows for evacuation of the chamber, charging with various gases, exhaust of spent gases and/or adjustment of pressure conditions within the chamber, as for example, equalization of pressure to accommodate cover withdrawal and unlocking as well as holding pressure to a process level. The gantry includes a work cylinder or motor for selected removal and placement of the cover element.

The ports in the shuttle or base plate are provided for access to the chamber to admit, for example, charging or purging gases and to remove or dilute unwanted gases within the void space in the vessel.

Where it is desired to accomplish radial dispersion of gases or radial inclination of the reaction in the material a hollow mandrel is extended axially through the reactor vessel. This includes admission apertures at the base and radial apertures through the mandrel walls and into the chamber. Where peel stock or wound sheet stock is to be treated the mandrel accommodates a spool of material which is lifted vertically into and out of the chamber when the chamber is open and clear of the gantry. Ignition is hence accommodated for radial propagation of the explosion. A purge of charge gas can also be accomplished when desired sweeping upward and around the stock.

The shuttle or indexing structure is power actuated and by use of air or hydraulic power components in connection with suitable limit switches the entire shuttle is made to easily sequence or index in accord with well known mechanical, hydraulic, pneumatic and/or electrical means and in accord with selected process requirement and including selected dwell beneath the gantry or work station and providing corresponding lapsed time for loading and/or unloading.

The separate lock means or wedge blocks are power actuated and secured the cover on the vessel with a positive simultaneous wedging action. This locking and unlocking is fast and saves considerable time over known securing means for pressure vessels. Seals in the vessel in engagement with cover and shuttle plate secure the system against the explosively generated high pressure conditions in the chamber of the vessel.

Not shown are vent piping providing for spent gases and inert sweep gases to be exhausted remotely from the situs of the apparatus and these may include ejector induced drift and suitable valving. Combustion sustaining mixes of gases are inserted into the vessel at desired pressures and selected fuel values and are fired or ignited so that combustion is initiated in the vessel.

In use for reticulation of polyurethane foam, for example, one vessel is loaded with a spool or coil of stock. At initial loading an empty vessel stands idle indexed beneath the gantry or work station. Then the shuttle is energized registering and indexing the loaded vessel beneath the gantry. The cover is closed. A sequence of gas treatment occurs; following a partial evacuation of the chamber the combustion sustaining mixture is injected; excess combustible gas is removed by an inert gas purge; valves are all closed and the gas train is ignited as by a spark gas. The resulting combustion or explosion elevates the pressure within the closed chamber which is secured in closed relation by the gantry structure and the material is thus uniformly subjected to a controlled reaction. The residual over pressures are reduced by venting through the cover valves and the cover is removed after the wedge locks are withdrawn and the shuttle or index plate is shifted so that the vessel being loaded while reaction was progressing beneath the gantry is then positioned for processing and the material which was subjected to reaction is removed from the now open vessel and the open vessel is then reloaded. The sequencing is repeated to provide a smooth and substantially continuous production greatly in excess of that available in single unit pressure vessel systems.

SPECIFIC DESCRIPTION

By reference to the drawings and particularly to FIG. 1, thereof, a shuttle index structure 11 in accord with the present invention is shown. This comprises a base 12 which includes a guide ways or tracks 13 upon which slidably and guidably is mounted the shuttle plate 14. On the shuttle plate 14 are mounted two reactor cylinders 15 and 16 in side by side spaced relation. As shown in FIG. 1 a gantry structure 17 bridges the reactor cylinder 16 and carries the cover plate 18 which is in covering registry over the cylindrical reactor elements 15 and 16, depending upon which reactor vessel is beneath the cover plate 18. The cover plate 18 suspends from the gantry top plate 19 and is moved toward and away from closure of the cylindrical vessel 15 or 16 by means of the reciprocating actuating cylinder or motor 20. Locking of the cover plate 18 to the pressure vessel 15 or 16 is by means of wedge locks generically numbered 21. An actuating cylinder or motor 22 of the double acting type is provided to move the shuttle plate 14 on the guideways 13. Accordingly, the piston of the actuating cylinder 22 is attached to the shuttle plate 14. In one extreme of its motion the actuating cylinder 22 is positioned as shown with the cylindrical vessel 16 beneath the gantry 17. In the fully extended position of the actuating cylinder 22, the pressure vessel 15 is placed in registry beneath the gantry 17 and the vessel 16 in opened condition is shuttled to the right on the ways 13. In such a position the vessel 16 can be unloaded and reloaded while the vessel 15 is beneath the gantry 17. Hence, in each position one of the vessels 15 or 16 is open for discharging the contents thereof and reloading.

Fuel mixture hoses 31 and 32 (FIG. 2) serve each of the vessels 15 and 16, respectively, through the shuttle plate 14. As will be seen, the fuel mixture hoses supply fuel to the ignition means. Provision is made for purging gases to be admitted through the shuttle plate to the vessels 15 and 16 through purging gas hoses 23 and 24.

The cover plate 18 is valved. The valving is by means of the large capacity valve 25 and the lower capacity valve 26 which pass through the cover plate 18 and are power actuated as sensed by limit switches 27 and 28 respectively. Control panel 29 is provided for convenient mounting of electrical power and sequencing controls. Where hydraulics or pneumatics are used the pump-tank or compressor 30 is preferably positioned adjacent to locations requiring the major supply of compressed fluid and is suitably and operably connected to the hydraulic and/or pneumatic control valving components, not shown. In general the hydraulic and mechanical controls are conventional and are adapted only to achieve the required or selected sequencing and timing for the process going on within the reaction vessels 15 and 16. The electrical and hydraulic controls per se are not a part of the present invention. This will be better appreciated as the description proceeds.

Figure 2:
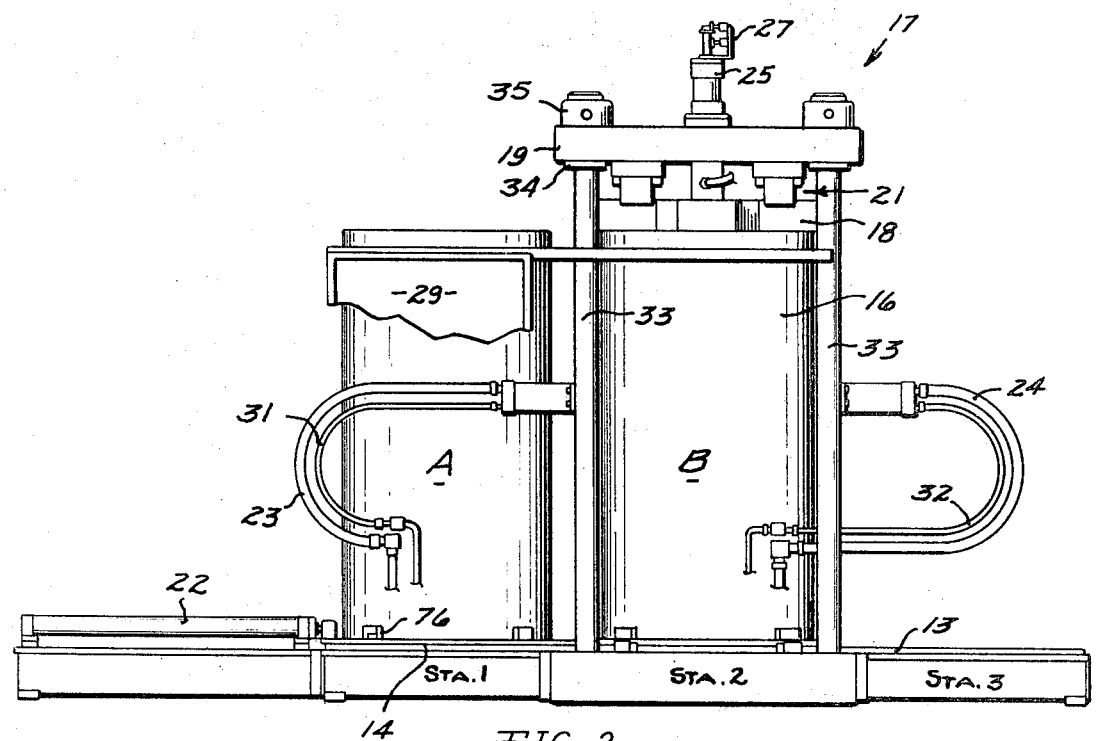
FIG. 2 is a side elevation view of the structure seen in FIG. 1.

In FIG. 2 the purge gas lines 23 and 24, respectively, are shown serving the vessels 15 and 16. Their connection through the manifold of the shuttle plate 14 will be better appreciated as the description proceeds. The gantry 17 is seen as comprising upstanding rods 33 between which the vessels 15 and 16 can move. The rods 33 are tension type rods registrable secured to the frame 12 at the gantry position and to the gantry top plate 19 as by the stop rings 34 and nuts 35. In accord with the structure so described, three positions are established in the frame 12 represented in the FIG. 2 as Station 1 (open), Station 2 (gantry), and Station 3 (open). The vessels are designated, respectively, A and B for later consideration of their sequencing.

By reference to FIG. 3 the gantry structure 17 is best appreciated in that the top plate 19 is seen to carry beneath it the cover plate 18 and the cover plate 18 is moved toward and away from the top plate 19 by means of the actuating cylinder 20 and its piston rod not shown. The piston rod of cylinder 20 is connected to cross bar 35b which is connected to two spaced apart guide shafts 35a and the shafts 35a operate in journals 36. The shafts 35a are firmly secured to the cover plate 18 by bracket 37. The top plate 19 is held secure on the tension rods 33 by the stops 34 and nuts 35. The valve elements 25 and 26, opened and closed by actuator cylinders 38 and 39, respectively, are positioned in the cover plate 18. The position of actuators 38 and 39 are monitored by the limit switches 27 and 28, respectively. Clearance openings 40 and 41, through the top plate 19, allow the valve elements 25 and 26, respectively, to move with the cover plate 18 without contact with the top plate 19. In the valve body 42 of the larger valve 25 an exhaust opening 43 is provided so that when the valve 25 is open the pressure within the vessel served is communicated through the opening 43, or selectively, the pressure in the vessel is reduced. Preliminary to insertion of a combustible mixture of gases the opening 43 allows a vacuum to be drawn in the reactor vessel at the work station. The seal of valve seat 44 is broken when valve stem 45 is moved axially upward in the body 42. Cap screws 46 secure the valve body 42 to the cover plate 18 and the drawing has been slightly modified by a partial rotation of the actuator carrier 47 so that the securing screws are visible. The lineal bearing 48, in the carrier 47 steadies the valve stem 45.

The valve 26 is similar in construction and actuation to the valve 25, but is substantially smaller. The valve body 49 is secured directly to the cover plate 18 as by cap screws 50. The piston rod 51 of the actuating cylinder 39 provides the valve stem and closes or opens at the seat 52. A valve port 53 is provided above the cover 18. The actuating cylinder 39, like the actuating cylinder 38 on the larger of the valves 25, is of the double acting type and the travel is monitored through the limit switches 28. The similarity of the seating arrangements of the two valves 25 and 26 can best be understood by reference to FIGS. 4 and 5 in which the valve seating is enlarged. The seating arrangement of the valves 25 and 26 is important in that they must withstand a substantial shock pressure generated within the reactor or pressure vessels 15 and 16.

In the larger valve 25, the tubular valve body 42 is secured to the cover 18 and is sealed peripherally against the cover 18 by the gasket means shown as an O-ring 53. An inwardly tapered flange provides a shoulder 54 integral with the valve body 42 and inside the body 42. Against the shoulder 54 an annular sealing ring 55 is provided which is made of a self-lubricating material and which is arcuately curved through the upper inner portion to blend with the contour of the tapered shoulder 54. This contoured ring 55 thus provides a means of compressing O-ring seal 60 on valve spool 56 carried at the end of the piston-stem 45 when valve 25 closes. The preferable material for the sealing ring 54 is polytetrafluoroethylene, a material available to the trade under the designation, "Teflon" or its equivalent known to have surface lubricity, good scuff resting properties, is non-fouling and possesses proper elastic deformation so that it wears well as a valve seat. Additionally this resin material has a high tolerance for heat without breakdown. The annular sealing ring 55 is secured in compressed relation against the shoulder 54 by the compression ring 57 secured to the body 42 by means of a cap screw 58.

The valve spool 56 is cylindrical and is provided with an annular sealing groove 59 which receives a suitably sized O-ring 60. The leading lower edge 61 of the spool 56 is smoothly chamfered. The landed portions of the disc 56, flanking the groove 59 and the O-ring seal 60 in groove 59 on valve spool 56 is in pressure contact on closure with the annular sealing ring 55. This provides an excellent valve seating arrangement for sudden shock pressure and allows axial opening and closing movement of the valve spool 56 without damage to the seal-journal seat. Also the action of valves 25 and 26 tend to wipe clean the sealing rings 55 and 64, respectively. This wiping action in the valves 25 and 26 is particularly important in operations involving debris or reaction residue.

In FIG. 5 the smaller valve 26 is illustrated and its construction generally parallels the construction of the larger valve 25 and the description will not be repeated except to point out that in the size reduction the inwardly taper-ing shoulder 54 is not required to control deformation. The seal at valve seat 52 is accomplished by the valve spool 62 and its O-ring 63 in tight fitted relation against the guiding annular "Teflon" ring 64 and the ring 64 is held firmly against the shoulder 65 by the compression ring 66 secured to the valve body 49 as by screws as shown and surrounding the opening to the valve seat 52.

The wedge blocks 21, designated generically in the FIGS. 1 and 2, are more completely understood by reference to FIG. 6. The wedge blocks 21 are interposed between top plate 19 of the gantry assembly 17 and the cover plate 18. The wedge block 67 is illustrated as a tapered or wedge shaped element reciprocal lineally in a way-block 68. The reciprocating means is the actuator cylinder 69 having its piston rod 70 operatively secured to the rear of the tapered wedge block 67. The cylinder 69 is secured to the top plate 19 by the base plate or mounting plate 70a. The plate 70a provides mounting means for the way-block 68 and the cylinder 69 and is fastened with screws or otherwise secured or bracketed to the top plate 19. A ramp 71 having a corresponding taper in the magnitude of between about five and about twelve degrees is registrably located in the cover 18 so that the block 67 is movable thereinto and removable therefrom. The selection of the taper is to provide an application of required closure and sealing pressure applied to the vertically movable cover plate 18 and to provide a locking angle so that upward force on the cover 18 from pressure within vessel 15 or 16 will not cause a retracting motion on wedge blocks 67 while assuring reasonable ease of withdrawal of the block 67. As previously described a plurality of the wedge lock assemblies 21 are provided between top plate 19 and cover plate 18 to accomplish simultaneous effective pressure closure of the vessels 15 and/or 16 beneath the gantry 17.

While illustrated as a down driving force on the cover 18 the wedge assemblies 21 may also provide a suitable closure by elevation of the vessel into contact with a closure element or plate and such modification is intended to be included in the description of the pressure closure at a gantry or process station in which pressure vessels are indexed for closure.

In FIG. 7 the shuttle plate 14 is best seen as between the rods 33 and riding in plane spaced relation on the guide journal elements 13. A plurality of guide bars 72 straddle selected of the guide journal elements 13 and are secured to the shuttle plate 14 so as to assure a guide track relationship on the shuttle path. The rods 33 are seen secured through the base element 73 as by means of the nuts 74 and keeper keys 75. As will be appreciated the reactor vessels 15 and 16 are secured on the shuttle plate 14 as seen in FIG. 2 as by brackets 76.

Figure 9:
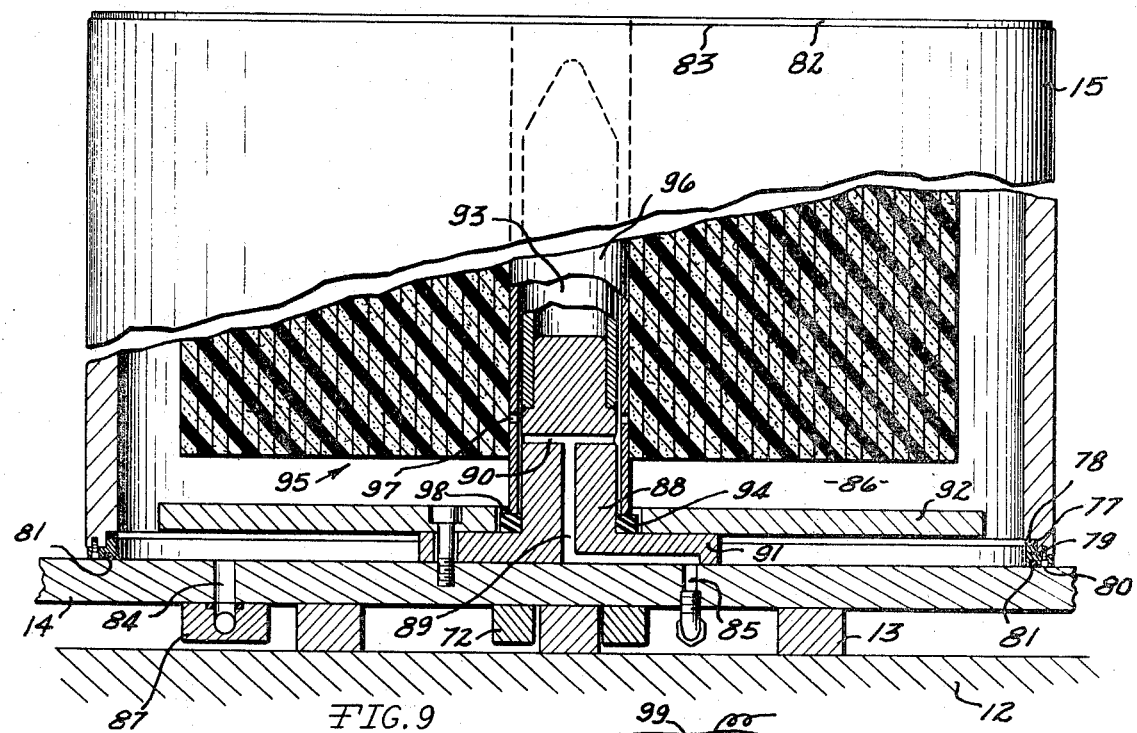
FIG. 9 is a side elevation of a pressure vessel as shown in FIG. 8 and including a spool of material in the vessel and partially cut away to indicate the structural interrelation of mandrel ignition port, and suppression sweep ports.
Figure 8:
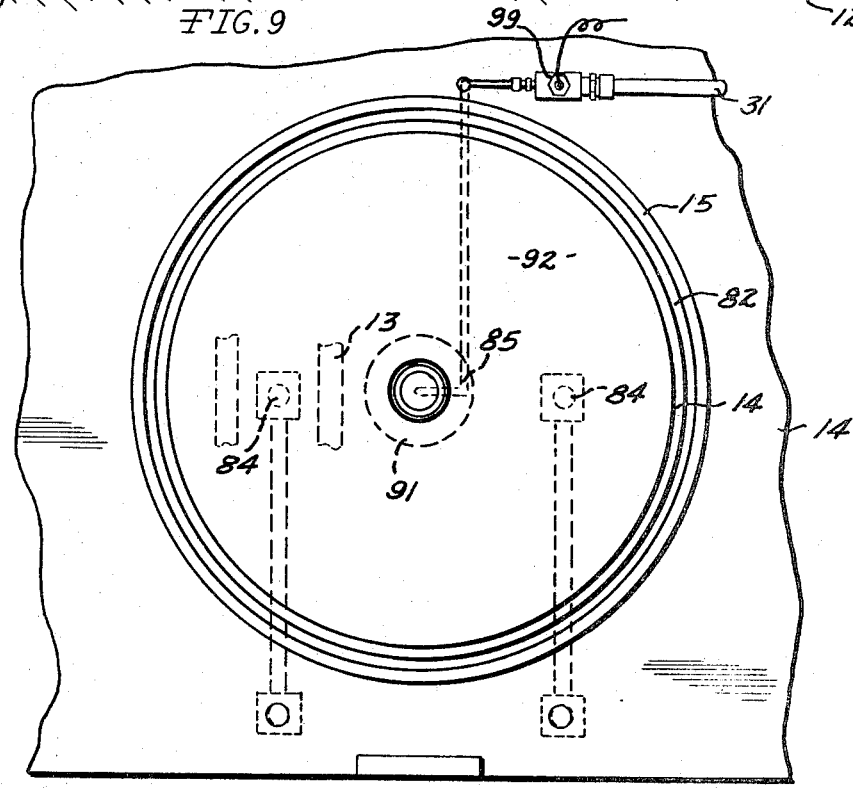
FIG. 8 is a top plan view of one of the pressure vessels in open position on a slide plate and indicating the gas introduction connections in phantom line.

By reference to FIGS. 8 and 9 the palcement of the vessels 15 and 16 is better understood and the actual construction of the vessel 15, identical to the vessel 16, is revealed. The vessel 15 is a steel pressure cylinder sealed peripherally at the base and secured on the shuttle plate 14. The cylinder 15 is provided with stepped internal shoulder 77 against which is compressibly fitted a seal ring 78. The ring 78 is compressively held in position by the annular securing ring 79 having a generally L- shaped cross section and retained in secure relation to the vessel by a plurality of tightening screws 80. An O-ring 81 is retained in an annular channel provided in the lower face of the securing ring 79 and upon mounting of the vessel 15 to the shuttle plate 14 the O-ring 81 is compressibly forced against the shuttle plate 14 in secure sealed relation. A similar annular seal 82 is provided on the upper and open end 83 of the vessel 15 so that as the cover plate 18 is lowered into covering engagement with the upper end of the vessel 15, a channel retained O-ring like the O-ring 81 seals the vessel 15 at engagement with the cover plate 18 and under the total seating compression of the wedge locks 21.

At least two ports 84 and 85 are provided through the shuttle plate 14 and into the cavity or interior 86 of the vessel 15. The port 84 is in communication through the manifold 87. The port 85 is served by the communicating piping, as shown. These ports are suitably connected, as by manifolding and/or hoses 23 and 31 so as to selectively introduce process initiation and suppression gases (inert) to the interior 86 of the vessel. The port 85 communicates through a manifold center hub 88 having a central passage 89 and radial passages 90 opening to the interior 86 thru ports 97 in tubular spindle 96 of the vessel 15. The hub element 88 supports, on its flange 91, a support or baffle platform 92. The upstanding portion of the hub 88 coaxially supports a conically tipped tubular mandrel 93. A flat gas seal 94 in the form of an annulus provides a resilient cushion block around the hub 88 at the base of the flange 91.

This arrangement is particularly suitable for receiving the spool of stock 95 on its radially perforate tubular spindle 96. The radial perforations 97 through the tubular walls of the spindle 96 allow the permeation of gas and/or initiation material into the mass of the stock 95 carried by the spindle 96. The lower end 98 of the spindle 96 seats against the seal element 94 and clearance between hub 88 and tubular spindle 96 allows for passage of the gases in a desired manner. The arrangement thus described allows a prespooled load of stock to be treated, to be easily loaded into the reactor pressure vessel, sliding over the mandrel 93 and symmetrically supported thereby during treatment and to have ignition or initiation of the treatment reaction to occur radially within the spool of stock. Unloading after treatment is equally facilitated. It will be appreciated that in instances of bulk loading of stock the hub-mandrel assembly thus described may be removed without departure from the spirit of the present invention and as generally seen in FIG. 1.

In the fuel lines 31 and 32 a spark initiator 99 is located, as for example, on the plate 14 of FIG. 8. The spark initiates detonation of the fuel mixture and the detonation moves through the lines 31 and 32 to the fuel impregnated vessel so as to suddenly raise the pressure and temperature in the vessel and its contents.

It will be appreciated by those skilled in the art that other entries to the vessel could be provided for introduction of fuel material, initiation of combustion and/or introduction of suppression gases, but in the shuttle-structure indicated the entry through the shuttle plate 14 is preferred.

In FIG. 10, the operation of the structure illustrated in FIGS. 1 and 2 is set out in graphic form. The vessels are indicated as Vessels A and B and the stations are indicated as Station 1 (open) Station 2 (gantry closure) and Station 3 (open). With the shuttle in the extreme left position Vessel A is loading in Station 1 and Vessel B is beneath the Gantry Station 2 ready for or undergoing treatment. Where both Vessels A and B are initially empty the Vessel B is idle as shown. After Vessel A is loaded and the shuttle is moved to the right, then Vessel A is under the gantry at Station 2 and process is initiated culminating in the "firing" or subjection of the contents of the closed vessel to high shock pressure and temperature. The Vessel B is thereupon at Station 3 where it can be unloaded and loaded free of the cover and in the loading or unloading position at Station 3 for the time required to evacuate, charge, suppress, fire and vent the Vessel A beneath the gantry. At the completion of the firing the cover is removed after the pressure in the vessel is returned to atmospheric pressure by means of the valving in the cover. The shuttle is then moved to the left placing the Vessel A in the unload-load position at Station 1, and the previously loaded Vessel B is located beneath the Gantry Station 2, the cover is lowered on the Vessel B, wedged closed to seal and processing is commenced involving reduction of pressure in the vessel, introduction of fuel, suppression, purging and is then fired. Meanwhile the Vessel A has been loaded and the cover, upon raising allows the shuttle to move to the right locating Vessel B for unload and load and locating Vessel A again beneath the gantry Station 2 for processing of its contents. After firing the shuttle repeats its movement to the left and the sequence is repeated continuously so that the processing time beneath the gantry Station 2 of either Vessel A or B allows ample time for unloading and loading of the open vessel.

OPERATION

Heretofore high pressure process treatments usually involved an autoclave type vessel in which loading was required, followed by process sequencing within the closed vessel and subsequent unloading. The time interval thus cumulated all of the times required and production was necessarily slow. The described structures admit of loading and unloading while processing is proceeding and establishes fast closure and closure removal wherein process control and sequencing facilities can be interlocked to control the opening, closing and shuttling of the pressure reactor vessels at optimum rates consistent with safe operation. Collaterally, advantage exists in the fact that only one set of valves and valve operators are required at the gantry position.

Essentially the process which occurs within the vessel contemplates a controlled explosion or detonation, a rapid oxidation or decomposition brought about by inserting a fuel-oxygen (for example, hydrogen-oxygen) or decomposible mixture and the subsequent ignition of the mixture or initiation of the decomposition. Fuel is admitted at proper mixture through the charge valve 26. Flow of fuel to the reactor vessel beneath the gantry is accomplished by reduction of pressure in the closed vessel beneath the gantry. This reduction in pressure is easiest accomplished, for example, by utilization of a steam ejector (not shown) ported to the vessel thru valve 25 after closure of the cover plate on the vessel. The ejector is shut off and valve 25 closed when a selected vacuum has been drawn in the vessel and then the charge valve 26 is opened permitting the introduction to the gantry or process station positioned vessel of the fuel oxygen mixture in a ratio which is controlled orificially and at selected pressure. The valve 26 is closed. Here it may be desired to allow a "soak" period so that the fuel permeates the mass of material to be treated in the reactor vessel. When a suppression sweep is required the valve 25 is reopened and allowing the introduction of a suppression gas such as nitrogen to enter the vessel at the bottom thru piping 23 or manifolds 87. This sweeps away excess fuel in the voids around the material and the sweeping inert gas and excess fuel is exhausted through the valve 25 with a counter balanced sweep valve (not shown) ported to opening 43 by external valving also not shown to maintain adequate back pressure within the vessel. During a typical 10 to 15 second sweep the pressure reduction from the initial charge pressure is above five percent or less.

The nitrogen flow is stopped by suitable valving in the line 23 or 24 and the charged vessel is fired. After firing the ejector is energized and pressure in the chamber is reduced by opening the valve 25 to the ejector stream. This evacuates the unwanted gaseous contents of the vessel under vacuum conditions and then inert gas such as nitrogen is again flowed into the vessel raising the pressure to atmospheric. The wedge locks are retracted. The cover plate is raised and the vessel and treated material is moved from beneath the gantry or process station for unloading and a newly loaded vessel is positioned beneath the gantry or process station for processing.

The hydraulic and electrical controls thus described are not considered a part of the present invention and are believed to comprise conventional electrical, hydraulic and/or pneumatic components interlocked to the process requirements beneath the gantry to provide pressure reduction, fueling, sweep, firing, exhaust and recycling as required. In some instances the suppression sweep is eliminated.

The apparatus thus described finds principal use in providing automatic operation to the process for bonding and/or reticulation expressed in the U.S. Letters Patent 3,175,025 by Henry C. Geen and Warren A. Rice. In addition the process of U.S. Letters Patent 3,456,047 of Clarence S. Vinton and Edwin E. Rice may be practiced using the presently described apparatus. The present apparatus is also amenable to high pressure shock treatment of other materials.

Having thus described our invention and a preferred embodiment thereof others skilled in the art will readily perceive obvious modifications and improvements therein and such modifications and improvements are intended to be included within the spirit of the invention limited only by our hereinafter appended claims.

We claim:

1. A pressure reaction chamber structure comprising:
   a work structure;
   a way including a plurality of stations and establishing a path indexing with said work structure;
   at least one vessel open at least at one end and movable on said way to registry with said work structure;
   a closure including sealing means at said registry and reacting against said work structure to close against said vessel in sealed relation to withstand an explosive high pressure surge in said vessel;
   valved means in fluid communication with the interior of said vessel at said registry of said vessel and said work structure whereby fuel is selectively supplied to said vessel; and
   an explosion initiating means in communicating relation with the interior of said vessel and actuatable after said vessel in registry with said work structure is closed, sealed and charged with fuel.

2. A pressure reaction chamber for confining explosive forces in one or more vessels comprising:
   a gantry structure;
   a valved closure on said gantry structure;
   a way beneath said gantry structure;
   at least one vessel open at least at one end and movable on said way to registry beneath said gantry and selectably closed by relative movement of said closure toward said vessel;
   a seal between said closure and said vessel;
   conduit means through and into said vessel and providing fuel and exhaust access to the interior of said vessel during closure; and
   an explosion initiating means in communicating relation with the interior of said vessel and actuatable after said vessel in registry with said work structure is closed, sealed and charged with fuel.

3. A lock and control structure for pressure reactor vessels comprising:
   a pressure vessel;
   a machine base through which said pressure vessel registrably passes;
   a closure plate movable toward and away from said pressure vessel;
   a seal intermediate said closure plate and said vessel;
   a motor secured on said machine base and connected to said closure plate for moving said closure plate toward and away from closing engagement with said pressure vessel and said seal;
   a plurality of conduits through said vessel and communicating with the interior thereof;
   a plurality of motor actuated valves acting to open and close said conduits; and
   a plurality of lineally acting and retractable wedge blocks acting between said machine base and said closure plate selectively urging and securing said closure plate in sealed relation against said vessel.

4. A closure for a pressure vessel comprising:
   a pressure vessel;
   a machine base through which said pressure vessel is registrably and selectively indexed;
   a closure plate movable toward and away from said pressure vessel;
   a seal intermediate said closure plate and said vessel;
   valved conduit means communicating with the interior of said vessel and through which said vessel is selectively explosively charged and initiated while holding against an explosive surge and then exhausted;
   power cylinder means connected to said machine base and to said closure plate whereby said closure plate is moved into and out of closed contact relation with said pressure vessel and said seal; and
   a plurality of lineally acting wedge blocks acting between said closure plate and said machine base locking and sealing said closure plate against said vessel; and
   power cylinder means drivably connected to said wedge blocks and secured to said machine base.

5. The structure of claim 4 wherein a vessel registering frame retains said power cylinder and said lineally acting wedge blocks and against which said cylinder and said blocks react in closure and locking of said vessel.

6. A semi automatic reactor structure for sequential shuttling of a pair of reactor vessels wherein one of said vessels is always in the open relation for selected loading or unloading comprising:
   a gantry;
   a track frame beneath and secured to said gantry and including three station positions, the intermediate station position being registrable beneath said gantry;
   a shuttle plate lineally movable on said track frame;
   a pair of substantially identical vertically axised tubular vessels on said shuttle plate in spaced apart relation, one of said vessels axially registrable beneath said gantry in each extreme of travel of said plate, both of said vessels open at the top and closed at the bottom;
   a closure plate secured by said gantry and vertically movable toward and away from closure of said vessels;
   a plurality of wedge blocks intermediate said gantry and said closure plate and horizontally movable into and out of ramp engagement with said closure plate to vertically wedge said closure plate into seal and lock engagement with said vessel;
   vacuum leads to said vessel in said gantry position;
   injection leads to said vessel in said gantry position selectively charging and sweeping said vessel;
   valves in said closure selectively conditioning said pressure within said vessel when closed;
   a charge firing lead in each of said vessels energized selectively after closure of said vessel;
   an axial partially hollow orienting mandrel in each of said vessels;
   a removable spool in each of said vessels telescopically and axially guided and supported by said mandrel and having flow orifices communicating with said hollow portion of said mandrel;
   a motor connected to selectively move said vessels on said shuttle plate into and out of registry beneath said gantry;
   a motor connected between said gantry and said closure plate moving said closure plate vertically;
   at least one motor driveably connected to move said wedge blocks into and out of lock-seal relation; and
   time and position sensitive valve actuating and sequencing means controlling communication to and conditions within said vessels when closed.

7. A pressure vessel for process treatment of spooled stock including injection of explosive mixture, suppression sweep, ignition and exhaust comprising:
- a cylindrical and closable pressure vessel;
- a hollow mandrel axially extending from the bottom of said vessel and registrably defining a passage through said vessel;
- a spool having a tubular axle with radial passages defined through said axle and axially removable over said mandrel;
- valved leads into said vessel through the walls thereof at least one of said leads connected to said passage to said hollow mandrel; and
- a spark generator selectively activated from outside of said vessel and acting in at least one of said leads into said vessel.

References Cited

UNITED STATES PATENTS

| | | | |
|---|---|---|---|
| 3,385,655 | 5/1968 | Huston et al. | 21—91 |
| 2,983,588 | 5/1961 | Bovard | 23—281 |
| 3,144,957 | 8/1964 | Anderson | 220—55.3 |
| 3,416,436 | 12/1968 | Tezuka | 100—224X |

FOREIGN PATENTS

| | | | |
|---|---|---|---|
| 763,637 | 12/1956 | Great Britain | 23—290.5 |

JAMES H. TAYMAN, Jr., Primary Examiner

U.S. Cl. X.R.

23—266, 281, 290; 49—361; 137—584; 141—269; 202—242; 220—44, 55.3; 264—80, 84